US008930017B2

(12) United States Patent
Kim et al.

(10) Patent No.: US 8,930,017 B2
(45) Date of Patent: Jan. 6, 2015

(54) LOADING CONTROL APPARATUS CAPABLE OF AUTOMATIC MAIL ALIGNMENT

(71) Applicant: Electronics and Telecommunications Research Institute, Daejeon (KR)

(72) Inventors: Dong Ho Kim, Daejeon (KR); Jae Gwan Song, Daejeon (KR); Hyongook Kim, Chungcheongnam-do (KR); Hoon Jung, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 91 days.

(21) Appl. No.: 13/782,372

(22) Filed: Mar. 1, 2013

(65) Prior Publication Data

US 2013/0282166 A1 Oct. 24, 2013

(30) Foreign Application Priority Data

Apr. 19, 2012 (KR) ........................ 10-2012-0041110

(51) Int. Cl.
*G06F 7/00* (2006.01)
*B07C 3/00* (2006.01)

(52) U.S. Cl.
CPC ...................................... *B07C 3/008* (2013.01)
USPC ........................................... 700/223; 700/224

(58) Field of Classification Search
CPC ............. B07C 3/008; B07C 5/00; B65H 1/00
USPC .................................................. 700/223, 224
See application file for complete search history.

(56) References Cited

U.S. PATENT DOCUMENTS

| | | | | |
|---|---|---|---|---|
| 5,313,404 | A | 5/1994 | Wu | |
| 2003/0134620 | A1 * | 7/2003 | Dutta et al. | 455/413 |
| 2004/0064326 | A1 * | 4/2004 | Vaghi | 705/1 |
| 2005/0216118 | A1 * | 9/2005 | Conard et al. | 700/223 |
| 2005/0253715 | A1 * | 11/2005 | Awobue | 340/569 |
| 2008/0162381 | A1 * | 7/2008 | Runstrom et al. | 705/402 |
| 2009/0313182 | A1 * | 12/2009 | Runstrom et al. | 705/402 |

FOREIGN PATENT DOCUMENTS

KR 2003-0004975 1/2003

* cited by examiner

*Primary Examiner* — Gene Crawford
*Assistant Examiner* — Kyle Logan
(74) *Attorney, Agent, or Firm* — Nelson Mullins Riley & Scarborough LLP

(57) ABSTRACT

The present invention relates to a loading control apparatus capable of aligning the mail automatically. The loading control apparatus includes a distribution unit configured to guide mail, inputted to the cargo box of an unmanned receipt apparatus, to any one of a plurality of mail capacity boxes, a gravimetry unit configured to measure the weight of the mail loaded onto the mail capacity box, and a control unit configured to determine a mail capacity box onto which the mail will be loaded based on the weight received from the gravimetry unit and control the distribution unit based on a result of the determination. In accordance with the present invention, registered ordinary mail received through the unmanned receipt apparatus is automatically aligned and loaded in order of the receipt of mail.

9 Claims, 5 Drawing Sheets

LOADING CONTROL APPARATUS CAPABLE OF AUTOMATIC MAIL ALIGNMENT

CROSS-REFERENCES TO RELATED APPLICATIONS

The present application claims priority under 35 U.S.C 119(a) to Korean Application No. 10-2012-0041110, filed on Apr. 19, 2012, in the Korean Intellectual Property Office, which is incorporated herein by reference in its entirety set forth in full.

BACKGROUND

Exemplary embodiments of the present invention relate to a loading control apparatus capable of aligning the mail automatically, and more particularly, to a loading control apparatus capable of aligning the mail automatically which are capable of automatically aligning registered ordinary mail inputted to an unmanned receipt apparatus.

In general, there is provided inquiry into whereabouts about a process from the receipt of registered ordinary mail to the delivery thereof on the basis of a letter. To this end, a registered number barcode certificate stamp is printed on and attached to the registered ordinary mail.

Meanwhile, there is recently installed an unmanned receipt apparatus which enables a customer to have standard ordinary mail (including the size of a letter of invitation) directly received without the help of a clerk at the window. The unmanned receipt apparatus supports the receipt of common ordinary mail and registered ordinary mail.

When a customer inputs registered ordinary mail to the unmanned receipt apparatus, a series of processing processes including gravimetry are performed, the postal rates are paid, electronic postmark is issued, and the inputted mail is moved to a cargo box, thereby completing the receipt.

Next, the received registered ordinary mail is recovered by a related employee and then handed over to dispatch business in the last-minute task step. Here, an employee moves the registered ordinary mail to a registration box for mail and performs a task of checking a specific direction of the mail and aligning mail.

However, the conventional unmanned receipt apparatus loads inputted registered ordinary mail onto the cargo box in a random order and direction, and the mail is contained in a mail-bag in a random order. Accordingly, there is a problem in that a lot of manpower, costs, and time are taken to perform the last-minute task.

As a related prior art, there is Korean Patent Laid-Open Publication No. 2003-0004975 (Jan. 15, 2003), entitle 'Intelligent Automatic Postal Teller'.

SUMMARY

An embodiment of the present invention relates to a loading control apparatus capable of aligning the mail automatically which are capable of reducing manpower, costs, and time taken to sort and align registered ordinary mail manually by automatically aligning registered ordinary mail, received through an unmanned receipt apparatus, in order of the receipt of the mail.

In one embodiment, a loading control apparatus capable of aligning the mail automatically includes a distribution unit configured to guide mail, inputted to the cargo box of an unmanned receipt apparatus, to any one of a plurality of mail capacity boxes, a gravimetry unit configured to measure the weight of the mail loaded onto the mail capacity box, and a control unit configured to determine a mail capacity box onto which the mail will be loaded based on the weight received from the gravimetry unit and control the distribution unit based on a result of the determination.

In the present invention, the mail is registered ordinary mail.

In the present invention, the distribution unit includes one or more gates rotatably installed on one side of the cargo box in which the plurality of mail capacity boxes has been vertically disposed and configured to change a course of a drop of the mail and a gate driving unit configured to drive the gates.

In the present invention, the gates are configured to correspond to the plurality of mail capacity boxes, respectively.

In the present invention, the gates are configured to go up and down along one side of the cargo box.

In the present invention, the control unit controls the distribution unit so that a mail capacity box onto which the mail will be loaded is changed when the weight of the mail is a reference weight or more.

In the present invention, the control unit controls the distribution unit so that the mail is sequentially loaded from a mail capacity box placed on the bottom of the cargo box.

In another embodiment, a loading control apparatus capable of aligning the mail automatically includes a distribution unit configured to guide mail, inputted to the cargo box of an unmanned receipt apparatus, to any one of a plurality of mail capacity boxes, a mail detection unit configured to generate a detection signal by detecting the mail, and a control unit configured to add the number of the mail in response to the detection signal received from the mail detection unit, determine a mail capacity box onto which the mail will be loaded based on the number of the mail, and control the distribution unit based on a result of the determination.

In the present invention, the control unit controls the distribution unit so that a mail capacity box onto which the mail will be loaded is changed when the number of the mail is a reference number or higher.

In the present invention, the control unit controls the distribution unit so that the mail is sequentially loaded from a mail capacity box placed on a bottom of the cargo box.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
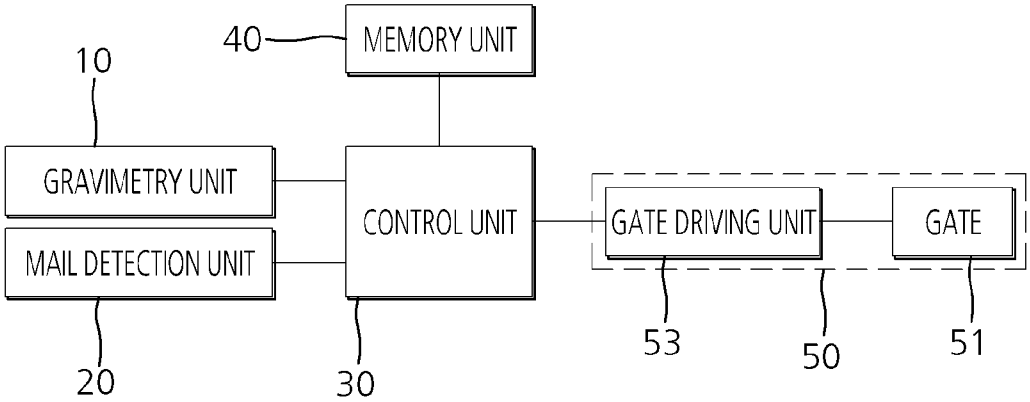
FIG. 1 is a block diagram showing the construction of a loading control apparatus capable of aligning the mail automatically in accordance with one embodiment of the present invention.
Figure 2:
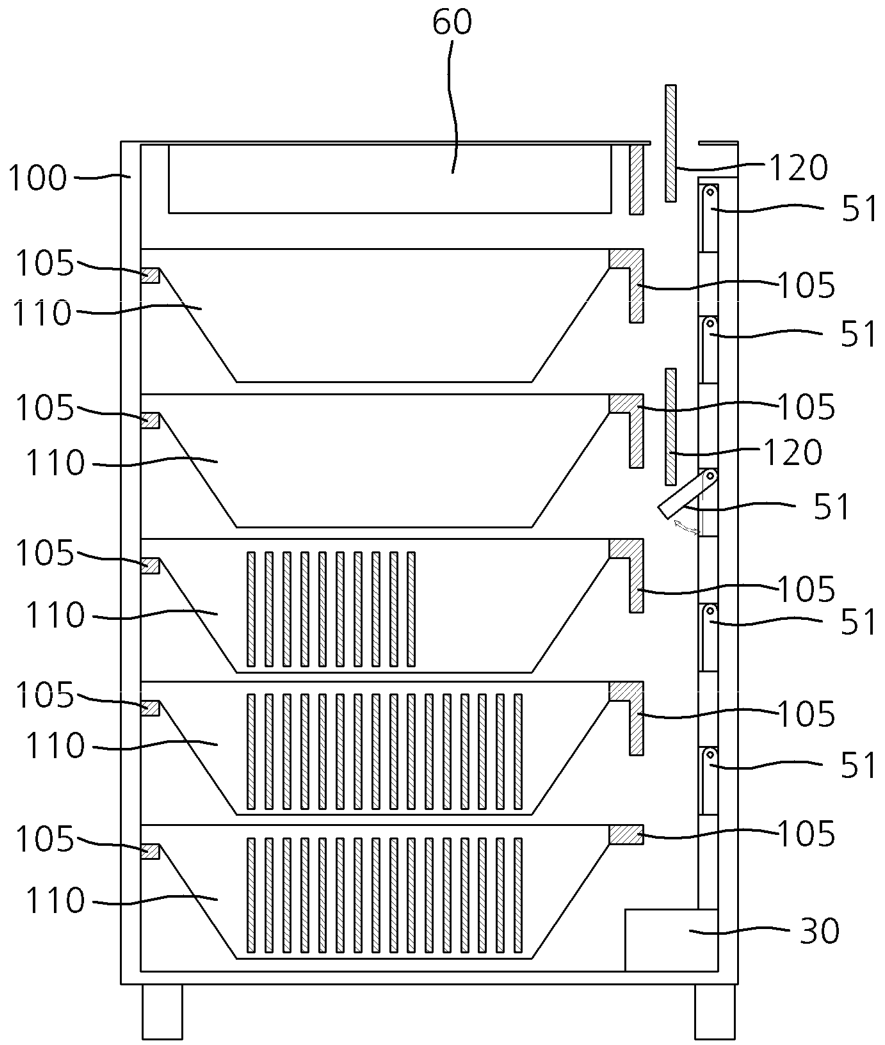
FIG. 2 is a diagram schematically showing the state in which the loading control apparatus capable of aligning the mail automatically has been installed in accordance with one embodiment of the present invention.

FIG. 1 is a block diagram showing the construction of a loading control apparatus capable of aligning the mail automatically in accordance with one embodiment of the present invention, and FIG. 2 is a diagram schematically showing the state in which the loading control apparatus capable of aligning the mail automatically has been installed in accordance with one embodiment of the present invention.

As shown in FIG. 1, the loading control apparatus capable of aligning the mail automatically in accordance with one embodiment of the present invention includes a gravimetry unit 10, a mail detection unit 20, a control unit 30, a memory unit 40, a distribution unit 50, and a display unit 60.

The gravimetry unit 10 measures the weight of the mail loaded onto each of a plurality of mail capacity boxes 110 included in the cargo box 100 of an unmanned receipt apparatus and transfer the measured weight to the control unit 30.

The gravimetry unit 10 is installed at the position where the weight of the mail loaded onto the mail capacity box 110 can be measured and can be embodied using a sensor capable of measuring pressure or load, such as a load cell.

As shown in FIG. 2, the mail capacity boxes 110 are installed in several layers within the cargo box 100 through supports 105. The gravimetry units 10 are mounted on the respective supports 105 and configured to measure the weight of the mail loaded onto the respective mail capacity box 110.

The mail detection unit 20 detects mail 120 inputted to the cargo box 100, generates a detection signal for informing the input of the mail 120 as a trigger signal, and transfers the trigger signal to the control unit 30.

The mail detection unit 20 includes a proximity sensor (not shown) or an infrared sensor transceiver sensor (not shown) capable of detecting the existence of the mail 120 at a point where the mail 120 is inputted and detects the mail 120 inputted to the unmanned receipt apparatus. The mail detection unit 20 can be embodied using a pressure sensor (not shown) installed at a gate 51 to be described later, and it can detect the mail 120 that collides against the gate 51.

Meanwhile, it may be preferred that the mail 120 inputted to the cargo box 100 be registered ordinary mail having a high necessity of automatic alignment, but the same automatic alignment principle can be applied to common ordinary mail.

The control unit 30 determines the mail capacity box 110 onto which the mail 120 inputted to the cargo box 100 will be loaded based on the weight of the mail received from the gravimetry unit 10.

Furthermore, the control unit 30 can add the number of the mail inputted to the cargo box 100 in response to a detection signal received from the mail detection unit 20 and determine the mail capacity box 110 onto which the mail 120 will be loaded based on the added number of the mail.

After determining the mail capacity box 110 onto which the mail 120 will be loaded as described above, the control unit 30 controls the distribution unit 50 so that the mail 120 inputted to the cargo box 100 is loaded onto the determined mail capacity box 110.

Here, the control unit 30 can control the distribution unit 50 so that the mail 120 is sequentially loaded from the mail capacity box 110 that is placed on the bottom of the cargo box 100.

That is, the control unit 30 can control the distribution unit 50 so that the mail 120 is automatically aligned and loaded from the mail capacity box 110 on the bottom of the cargo box 100 to the mail capacity box 110 at the top of the cargo box 100 in order of the receipt of mail inputted to the cargo box 100.

The memory unit 40 stores information on the weight of the mail and the number of the mail which has been loaded onto each of the mail capacity boxes 110.

The distribution unit 50 guides the mail 120, inputted to the cargo box 100, to any one of the plurality of mail capacity boxes 110 included in the cargo box 100.

As shown in FIG. 2, the distribution unit 50 includes the one or more gates 51 rotatably disposed on one side of the cargo box 100 and configured to change a course of a drop of the mail 120 and a gate driving unit 53 configured to drive the gates 51 under the control of the control unit 30.

The gate 51 passes the mail 120 that is closely adhered to one side of the cargo box 100 and inputted without interruption, and the gate 51 is obliquely rotated to the inside of the cargo box 100 by the gate driving unit 53, thus changing a course of a drop of the mail 120 so that the mail 120 is loaded onto the mail capacity box 110.

That is, the mail 120 inputted to the unmanned receipt apparatus does a free fall and then collides against the gate 51 that has been rotated to the inside of the cargo box 100. Next, the mail 120 is moved to the mail capacity box 110 corresponding to the corresponding gate 51 under the guidance of the gate 51 and is then loaded onto the mail capacity box 110.

Furthermore, the gates 51 can be installed in the respective mail capacity boxes 110, as shown in FIG. 2.

Meanwhile, the gate driving unit 53 can be embodied using a driving motor (not shown) for rotating the gate 51.

The display unit 60 displays the load state of the cargo box 100.

The term 'load state' can include information on the weight of the mail and the number of the mail that has been loaded onto each of the mail capacity boxes 110 included in the cargo box 100 and information on whether the cargo box 100 is a full load condition or not. For reference, the full load condition of the cargo box 100 means that the weight of the mail 120 exceeds a maximum load weight of the cargo box 100 and thus all the mail capacity boxes 110 are filled to the capacity.

Figure 3:
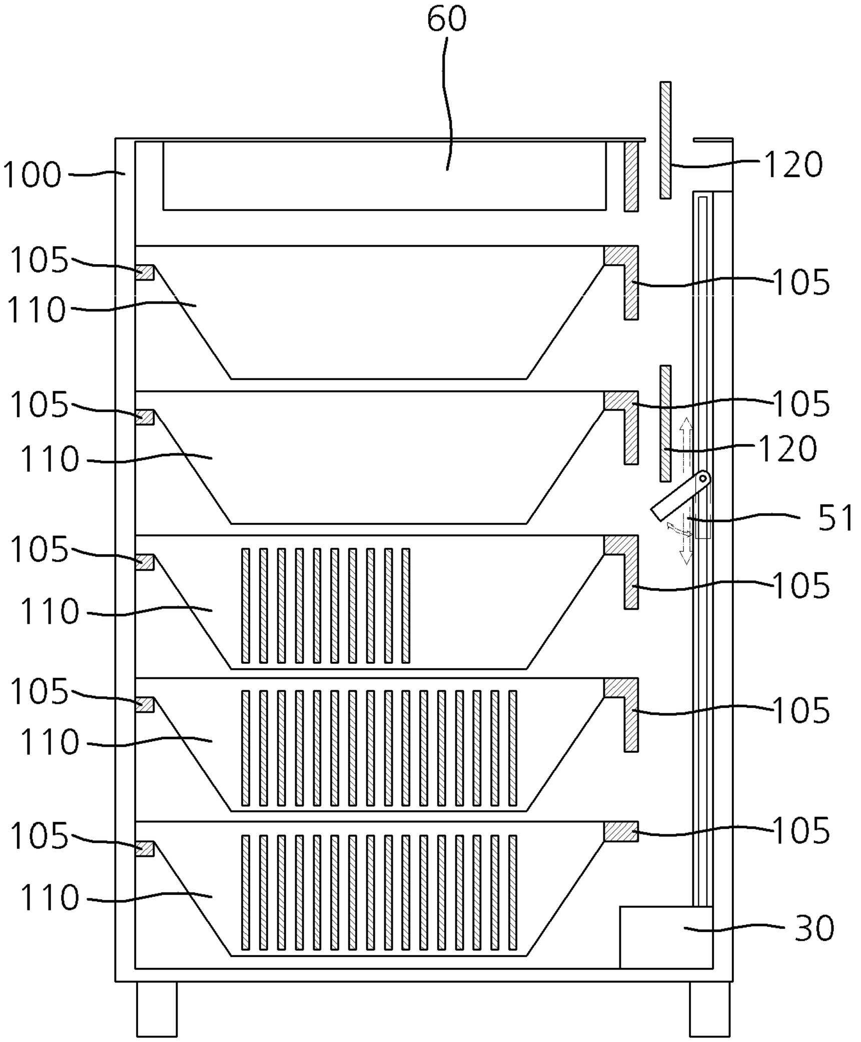
FIG. 3 is a diagram schematically showing the state in which the loading control apparatus capable of aligning the mail automatically has been installed in accordance with another embodiment of the present invention.

FIG. 3 is a diagram schematically showing the state in which the loading control apparatus capable of aligning the mail automatically has been installed in accordance with another embodiment of the present invention.

Meanwhile, an example in which the plurality of gates 51 is installed in the respective mail capacity boxes 110 has been described in connection with the previous embodiment. Unlike in the previous embodiment, however, one gate 51 can be configured to go up and down along one side of the cargo box 100.

More particularly, as shown in FIG. 3, one gate 51 can go up and down along one side of the cargo box 100, move to a position corresponding to the mail capacity box 110 onto which the mail 120 will be loaded, and then obliquely rotate to the inside of the cargo box 100 so that the mail 120 is loaded onto the corresponding mail capacity box 110. In this case, the gate driving unit 53 includes means for making the gate 51 go up and down.

If the gate 51 operates as described above, there is an advantage in that the loading control apparatus can be embodied using a simple structure as compared with the above construction because the mail 120 can be distributed using one gate 51.

Figure 4:
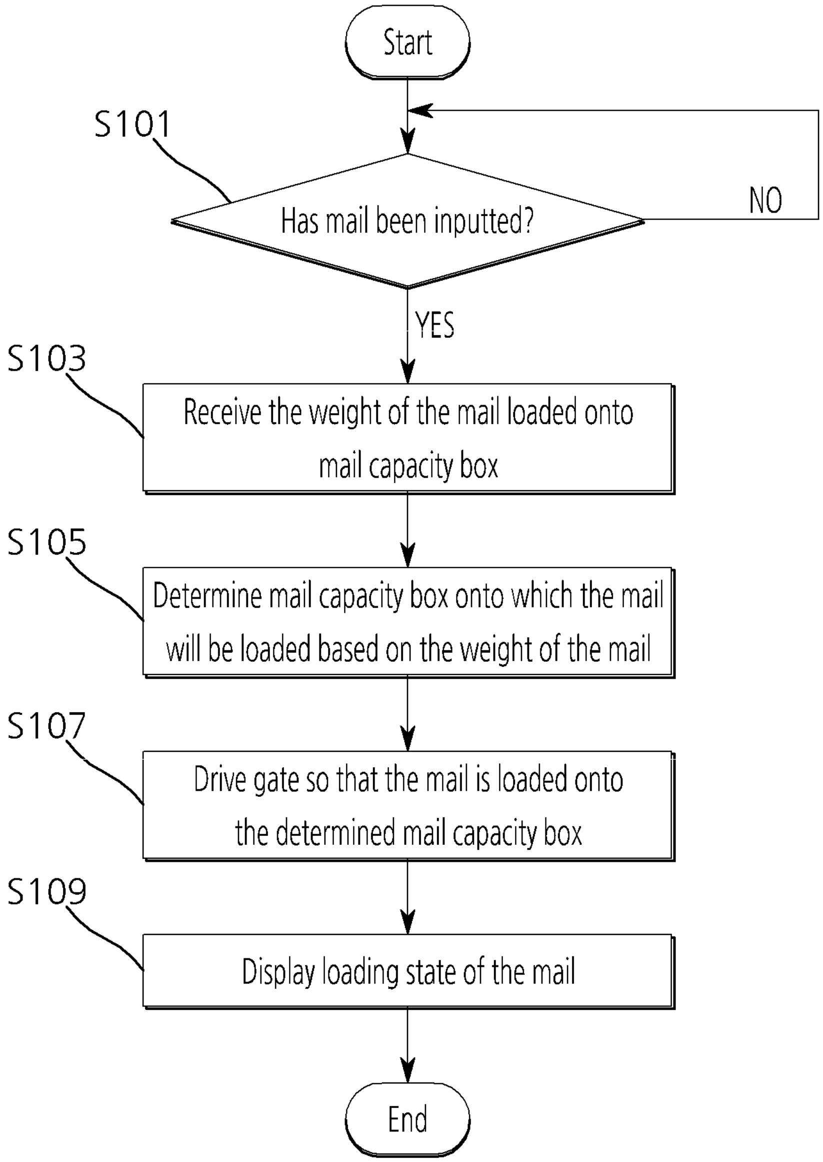
FIG. 4 is a flowchart illustrating an operation of a loading control method capable of aligning the mail automatically in accordance with one embodiment of the present invention.

FIG. 4 is a flowchart illustrating an operation of a loading control method capable of aligning the mail automatically in accordance with one embodiment of the present invention. A detailed operation of the present invention is described with reference to FIG. 4.

First, the control unit 30 checks whether the mail 120 is inputted to the cargo box 100 or not at step S101.

Here, the control unit 30 can check whether the mail 120 has been inputted or not in response to a detection signal received from the mail detection unit 20 or check whether the mail 120 has been inputted or not based on information on the receipt of the mail 120 received from a receipt control unit (not shown) that controls the receipt of the mail 120 in the unmanned receipt apparatus.

If, as a result of the check, it is determined that the mail 120 has been inputted, the control unit 30 receives the weight of the mail, loaded onto each of the mail capacity boxes 110, from the gravimetry unit 10 at step S103.

The control unit 30 determines the mail capacity box 110 onto which the received mail 120 will be loaded based on the weight of the mail received from the gravimetry unit 10 at step S105.

More particularly, if the weight of the mail loaded onto the mail capacity box 110 is a reference weight or more, the control unit 30 can change the mail capacity box 110 to another mail capacity box 110 onto which the mail 120 will be loaded. The control unit 30 can change the mail capacity box 110 so that the mail 120 is sequentially loaded from the mail capacity box 110 placed on the bottom of the cargo box 100.

The control unit 30 controls the gate driving unit 53 in order to drive the gate 51 so that the mail 120 is loaded onto the determined mail capacity box 110 at step S107.

More particularly, if the weight of the mail loaded onto the mail capacity box 110 placed on the bottom of the cargo box 100 is the reference weight or more, the control unit 30 controls the gate driving unit 53 so that the mail 120 is loaded onto the mail capacity box 110 right on the mail capacity box 110 placed on the bottom of the cargo box 100. Likewise, the control unit 30 can sequentially load the mail 120 up to the mail capacity box 110 placed at the top of the cargo box 100.

After controlling the gate driving unit 53 so that the mail 120 is guided to a specific mail capacity box 110, the control unit 30 displays the load state of the mail 120 in the display unit 60 at step S109.

As described above, the control unit 30 automatically aligns and load registered ordinary mail, received through the unmanned receipt apparatus, sequentially in order of the receipt of the mail. Accordingly, manpower, costs, and time taken to sort and align registered ordinary mail manually can be reduced.

Figure 5:
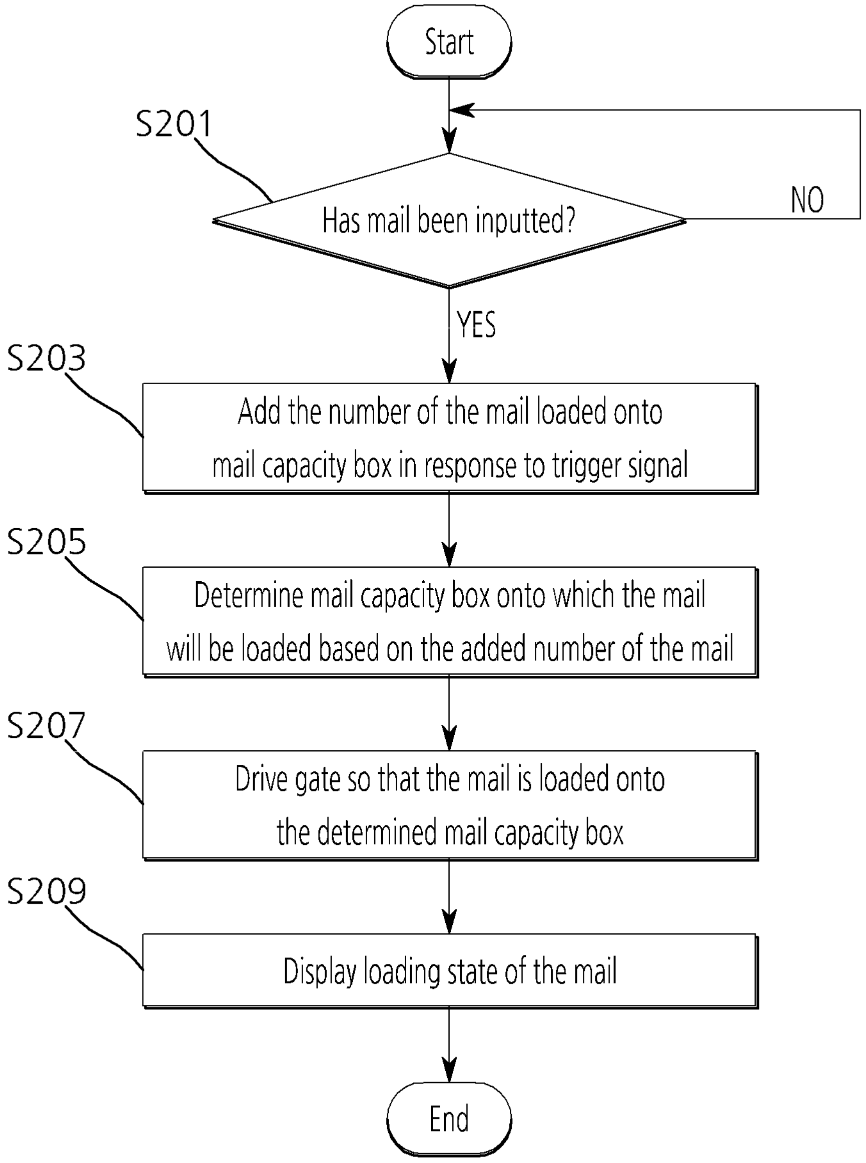
FIG. 5 is a flowchart illustrating an operation of a loading control method capable of aligning the mail automatically in accordance with another embodiment of the present invention.

FIG. 5 is a flowchart illustrating an operation of a loading control method capable of aligning the mail automatically in accordance with another embodiment of the present invention. A difference between the loading control method of FIG. 4 and the loading control method of FIG. 5 is chiefly described below with reference to FIG. 5.

In the above-described embodiment, an example in which the control unit 30 determines the mail capacity box 110 onto which the mail 120 will be loaded based on the weight of the mail loaded onto each of the mail capacity boxes 110 has been described. In the present embodiment, the control unit 30 can determine the mail capacity box 110 onto which the mail 120 will be loaded based on the number of the mail that has been loaded onto each of the mail capacity boxes 110.

More particularly, the control unit 30 checks whether the mail 120 has been inputted at step S201. If, as a result of the check, it is determined that the mail 120 has been inputted, the control unit 30 adds the number of the mail that has been loaded onto each of the mail capacity boxes 110 in response to a trigger signal received from the mail detection unit 20 at step S203.

The control unit 30 determines the mail capacity box 110 onto which the inputted mail 120 will be loaded based on the number of the mail added as described above at step S205.

More particularly, if the number of the mail loaded onto the mail capacity box 110 is a reference number or higher, the control unit 30 can change the mail capacity box 110 onto which the mail 120 will be loaded.

Next, processes of the control unit 30 controlling the gate driving unit 53 so that the mail 120 is loaded onto the corresponding mail capacity box 110 and displaying the load state of the cargo box 100 at steps S207 and S209 are the same as those of the above-described embodiment, and thus a detailed description thereof is omitted.

Meanwhile, in the present embodiments, an example in which the mail capacity box 110 onto which the mail 120 will be loaded is determined based on the weight of the mail loaded onto the mail capacity box 110 or based on the number of the mail loaded onto the mail capacity box 110 has been described. In some embodiments, the mail capacity box 110 onto which the mail 120 will be loaded can be determined according to a variety of conditions by combining the weight of the mail and the number of the mail.

As described above in accordance with the loading control apparatus capable of aligning the mail automatically according to the present invention, registered ordinary mail received through the unmanned receipt apparatus is automatically aligned and loaded in order of the receipt of mail. Accordingly, manpower, costs, and time taken to sort and align received registered ordinary mail manually can be reduced.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A loading control apparatus capable of aligning mail automatically, comprising:

a distribution unit configured to guide mail, inputted to a cargo box of an unmanned receipt apparatus, to any one of a plurality of mail capacity boxes;

a gravimetry unit configured to measure a weight of the mail loaded onto the mail capacity box; and a control unit configured to determine a mail capacity box onto which the mail will be loaded based on the weight received from the gravimetry unit and control the distribution unit based on a result of the determination, wherein the distribution unit comprises one or more gates rotatably installed on one side of the cargo box in which the plurality of mail capacity boxes has been vertically disposed and configured to change a course of a drop of the mail, and a gate driving unit configured to drive the one or more gates.

2. The loading control apparatus of claim 1, wherein the mail is registered ordinary mail.

3. The loading control apparatus of claim 1, wherein the gates are configured to correspond to the plurality of mail capacity boxes, respectively.

4. The loading control apparatus of claim 1, wherein the gates are configured to go up and down along one side of the cargo box.

5. The loading control apparatus of claim 1, wherein the control unit controls the distribution unit so that a mail capacity box onto which the mail will be loaded is changed when the weight of the mail is a reference weight or more.

6. The loading control apparatus of claim 5, wherein the control unit controls the distribution unit so that the mail is sequentially loaded from a mail capacity box placed on a bottom of the cargo box.

7. A loading control apparatus capable of aligning mail automatically, comprising:

a distribution unit configured to guide mail, inputted to a cargo box of an unmanned receipt apparatus, to any one of a plurality of mail capacity boxes;

a mail detection unit configured to generate a detection signal by detecting the mail; and a control unit configured to add a number of the mail in response to the detection signal received from the mail detection unit, determine a mail capacity box onto which the mail will be loaded based on the number of the mail, and control the distribution unit based on a result of the determination, wherein the distribution unit comprises one or more gates rotatably installed on one side of the cargo box in which the plurality of mail capacity boxes has been vertically disposed and configured to change a course of a drop of the mail, and a gate driving unit configured to drive the one or more gates.

8. The loading control apparatus of claim 7, wherein the control unit controls the distribution unit so that a mail capacity box onto which the mail will be loaded is changed when the number of the mail is a reference number or higher.

9. The loading control apparatus of claim 7, wherein the control unit controls the distribution unit so that the mail is sequentially loaded from a mail capacity box placed on a bottom of the cargo box.

* * * * *